Figure 1:
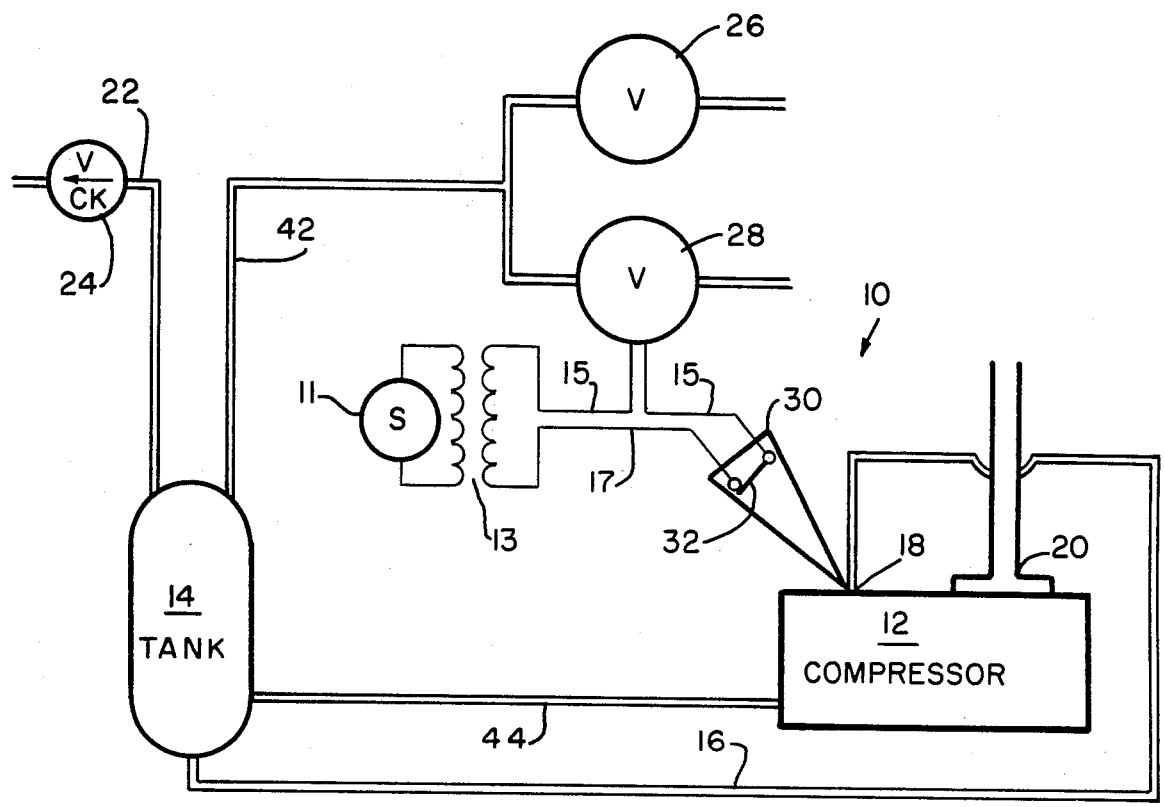

United States Patent [19]

Keith

[11] Patent Number: 4,583,919

[45] Date of Patent: Apr. 22, 1986

[54] LUBRICATION SYSTEM FOR A COMPRESSOR

[75] Inventor: Jeffrey S. Keith, Charlotte, N.C.

[73] Assignee: Ingersoll-Rand Company, Woodcliff Lake, N.J.

[21] Appl. No.: 621,750

[22] Filed: Jun. 18, 1984

[51] Int. Cl.⁴ .............................................. F04B 39/04
[52] U.S. Cl. ...................... 417/228; 418/84; 418/DIG. 1; 184/6.16; 184/6.3
[58] Field of Search ............... 417/228, 32, 292, 281, 417/13; 418/84, DIG. 1; 62/193; 184/6.1, 6.16, 6.3, 6.4

[56] References Cited

U.S. PATENT DOCUMENTS

| | | | |
|---|---|---|---|
| 3,349,994 | 10/1967 | Bloom | 417/228 |
| 3,429,502 | 2/1969 | Lundvik | 417/228 |
| 3,542,497 | 11/1970 | Chapuis | 418/84 |
| 3,618,708 | 11/1971 | Deines | 184/6.16 X |
| 3,698,838 | 10/1972 | Holdsworth et al. | 417/228 |
| 4,063,855 | 12/1977 | Paul | 417/228 X |
| 4,123,203 | 10/1978 | Kathmann et al. | 418/84 X |
| 4,171,188 | 10/1979 | Anderson et al. | 417/295 X |
| 4,262,775 | 4/1981 | Webb | 184/6.16 X |
| 4,289,461 | 9/1981 | Van Oorschot et al. | 418/84 |

FOREIGN PATENT DOCUMENTS

| | | | |
|---|---|---|---|
| 611354 | 12/1960 | Canada | 417/228 |
| 134788 | 10/1980 | Japan | 418/84 |
| 140586 | 8/1982 | Japan | 417/228 |

Primary Examiner—William L. Freeh
Assistant Examiner—Paul F. Neils
Attorney, Agent, or Firm—B. J. Murphy

[57] ABSTRACT

In a first embodiment, the invention comprises supplanting the usual, single, electrically-operated, blow-down valve, located on the receiver/separator tank of a gas compressor system with a pair of valves operatively arranged in parallel. The one valve operates normally in the manner of the supplanted valve, albeit with reduced venting capacity, and the other is held closed on starting of the compressor. This restricts the venting of the tank and causes its quick pressurization, to induce prompt oil injection for the compressor. A sensor detects the injection oil temperature and when the latter has achieved a given setpoint, the other, vent-restricting valve is opened. Accordingly, the method comprises sensing the temperature of the oil injected into the compressor and holding one of the paired venting valves closed until the oil temperature reaches the aforesaid given or predetermined setpoint.

6 Claims, 2 Drawing Figures

LUBRICATION SYSTEM FOR A COMPRESSOR

This invention pertains to lubrication systems for machines, and to methods of improving lubricant injection in machines, and in particular to such lubrication systems for use in combination with a pump, gas compressor, gas expander or the like, and a method of improving lubricant injection for a pumpless gas compressor.

In known gas compressors which have no oil pump, it is required that the receiver/separator tanks have sufficient pressure therein to provide adequate oil injection on start up. However, this object is frustrated by the typical blowdown valve used with receiver/separator tanks.

To prevent compressor rumble during the unloaded mode of operation, it is a common practice to allow a small amount of "make-up" air to flow through the compressor. Typically, the make-up air is vented to atmosphere through a single, electrically-operated, blowdown valve located on the receiver/separator tank. In pumpless compressor systems, the unloaded tank pressure is maintained only high enough to prevent rumble, thus minimizing power absorption during unloaded operation.

Start up, particularly low ambient starting, can be a problem for such pumpless compressor systems where oil flow (which is dependent on tank pressure) must be established quickly in order to prevent oil starvation of the compressor.

It is an object of this invention to set forth a lubrication system which will prevent oil starvation of a pumpless gas compressor on start up. It is also an object of this invention to set forth, in combination with a machine such as a pump, gas compressor, gas expander, or the like, adapted to handle a working fluid, a lubrication system for the machine, comprising first means for conducting working fluid to said machine; second means for conducting working fluid and lubricant from said machine; reservoir means for storing lubricant; and third means communicating with said reservoir means and said machine for passing lubricant therethrough from said reservoir means to said machine; wherein said second means communicates with said reservoir means for passing lubricant therethrough to said reservoir means; and further including means, coupled to one of said first and second means, operative for controllingly modulating the fluid conduct of said one means; means, coupled to one of said second and third means, for sensing a given condition of lubricant therein; and means, coupled to said sensing means and said modulating means, responsive to a given setpoint of said given condition, as sensed by said sensing means, for operating said modulating means.

It is a further object of this invention to set forth a method of improving lubricant injection in a gas compressor system which has (a) a gas compressor, (b) first means for admitting gas into the compressor, (c) second means for discharging gas and oil from the compressor, (d) third means for storing, under pressure, gas and oil discharged from the compressor, (e) fourth means communicating with said storing means for injecting oil, under pressure, into the compressor, and (f) fifth means for venting gas from said storing means, wherein said first means is operative in a first mode for providing unrestricted gas admittance and in a second mode for throttling gas admittance, and said fifth means is operative in a first mode for providing restrictive venting of gas and in a second mode for providing unrestricted venting of gas, said method comprising the steps of sensing the temperature of oil injected into the compressor; and operating one of said first and fifth means in said first operative mode thereof only until the injected oil achieves a given, setpoint temperature.

Figure 2:
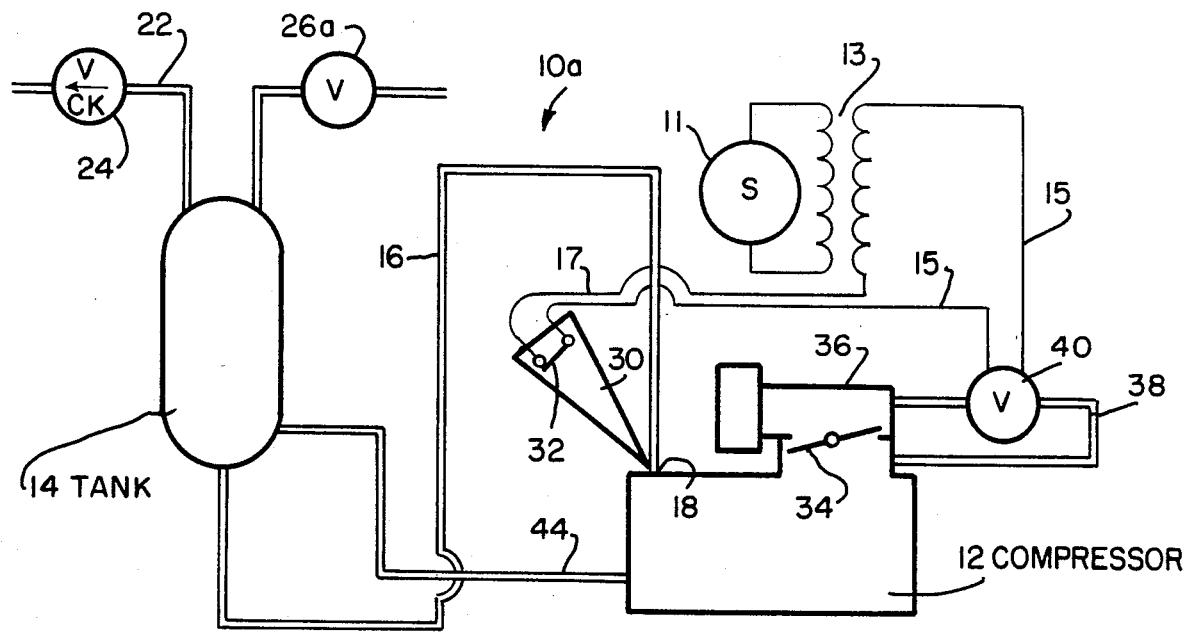

Further objects of this invention as well as the novel features thereof will become more apparent by reference to the following description taken in conjunction with the accompanying figures, in which:

FIG. 1 is a schematic diagram of a gas compressor system incorporating a first embodiment of the invention; and FIG. 2 is a schematic diagram of a gas compressor system, similar to that of FIG. 1, which, however, incorporates an alternative, second embodiment of the invention.

As shown in the figures, a gas compressor system 10, has a gas compressor 12 of the pumpless type in communication with a receiver/separator tank 14. The latter receives the compressed gas product of the compressor 12. It also stores therein injection oil, for the compressor 12, which has been separated out from the compressed gas product. A line 16 communicates the lower end or reservoir portion of the tank 14 with the compressor oil injection access 18, and the compressor 12 has a customary air inlet port 20. A discharge line 22 is coupled to the tank and to a check valve 24 from which to supply compressed gas for the end item use. In addition, the tank 14 has a pair of vent valves 26 and 28 communicating therewith in parallel. The first of the valves 26 operates, as is well-known in the prior art, to vent the tank 14 during the unloaded mode of operation of the compressor 12. However, its venting capacity is considerably less than that of a usual, prior art venting valve. The second valve 28, normally open, is operated, according to the invention, depending upon the temperature of the oil injected into the compressor 12. When open (after temperature setpoint has been reached), it cooperates with valve 26 to provide a customary venting capacity as is necessary to discharge "make-up" air.

Valve 28 is a solenoid-operated component, sold under the trademark Lucifer, by Sperry Vickers, a division of Sperry Corporation, 1401 Crooks Road, Troy, Mich. 48084; the Lucifer valve 28 is identified by the manufacturer by part number U322G2501BOR2.

A temperature sensor 30 is connected to a temperature switch 32, the sensor 30 being in sensing communication with the oil injected via access 18. Sensor 30 and switch 32 are an integrated element sold by Fenwal, Inc., 400 Main Street, Ashland, Mass. 01721 under the part number 08-810019-285/08-990000-085. The sensor 30/switch 32 is shown only symbolically, functionally and sensingly coupled to the lubrication injection of access 18. A source of electrical power 11 is conducted to a transformer 13, and from the latter, via lines 15 and 17, power is supplied to valve 28 and switch 32. The switch 32, therefore, is coupled to, and operative of, the valve 28. The latter is normally open, as noted, and is closed when the start-up cycle for the compressor begins. In turn, the sensor 30 will not actuate the switch 32, to open the valve 28, until some predetermined oil temperature setpoint is sensed. While there may be other, suitable sources for a sensor and temperature switch component, serving the functions of sensor 30 and switch 32, Fenwal, Inc., of 400 Main Street, Ashland, Mass., 01721 markets such a component under the part number 08-810019-285/08-990000-085.

At start-up of the compressor 12, the one valve 26 remains open (permitting air flow) and the other valve 28 is closed (no air flow). The closed valve 28 acts as an orifice restricting the exhaust air flow from the tank 14. This elevates the pressure in the tank 14 which, as a consequence, quickly increases oil flow. The valve 28, as noted, is controlled by the temperature switch 32 actuated by the sensor 30 which senses the compressor oil injection temperature. When the injected oil temperature reaches the predetermined or specified setpoint, indicating satisfactory oil flow, the sensor 30 opens the temperature switch 32, which opens the valve 28, causing the tank pressure to drop to the normal, unloaded level.

An alternative embodiment of the invention is shown in FIG. 2 where same or similar index numbers denote same or similar elements or components as in FIG. 1.

The second embodiment of the invention shown in association with a gas compressor system 10a in FIG. 2 has the usual, single, vent valve 26a connected to the tank 14, but here the typical butterfly valve 34 disposed in the air inlet duct 36 is bypassed. A bypass line 38 is arranged to shunt the butterfly valve 34, and intermediate the length of the line 38 there is a normally closed bypass valve 40. The valve 40 is coupled to, and controlled by, the temperature switch 32 which is actuated depending upon the temperature level of the injected oil. Valve 40 is very much like valve 28 (of FIG. 2), being solenoid-operated and also being available from Sperry Vickers, or a like source.

At start-up of the compressor 12, the inlet bypass valve 40 is opened, thus allowing more make-up air to pass through the duct 36, and into and through the compressor, than normal. The increased make-up air causes an elevated pressure in the tank 14, which, in turn, increases oil flow to the compressor. The bypass valve 40 is controlled by the temperature switch 32, the latter being controlled by the sensor 30 which senses the compressor oil injection temperature. When the injected oil temperature reaches the specified setpoint, indicating satisfactory oil flow, the temperature switch 32 closes the valve 40, and the tank pressure drops to the normal unloaded level.

In FIGS. 1 and 2 the valves 26, 28 and 26a are shown communicating with the tank 14 via lines 42, and lines 44 conduct the compressed gas product and entrained oil to the tanks 14. Now then, it will be commonly understood that lines 44 and 22 are provided for conducting working fluid from the compressor 12, i.e., to supply the compressed gas product to the user or end item equipment. However, and for the purposes of construing the appended claims, it must be recognized that valves 26, 28 and 26a, and lines 44 and 42, in cooperation with tanks 14, also comprise means which similarly conduct working fluid and/or working fluid and lubricant from the compressors 12. In neither embodiment of the invention is the common delivery means for the compressed gas product, i.e., lines 44 and 22, in conjunction with tanks 14, any different from prior art arrangements. It is in the embodiment of FIG. 1, however, where the otherwise common, venting conduct of working fluid (gas) from the compressor 12 is inventively altered by my teaching.

Each embodiment of the invention lends itself most readily to retrofitting of gas compressor systems. Clearly, with reference to FIG. 1, it remains only to supplant the usual, single, receiver/separator tank vent valve with valves 26 and 28, the latter comprising, together, a venting capacity equal to that of such supplanted valve. Then, by incorporating the sensor 30 and switch 32, in operative coupling with the access 18 and valve 28, the first embodiment of the invention is in place. Similarly, the FIG. 2 embodiment employs a same sensor 30 and switch 32, the latter operatively joined to the valve 40. The line 38, in which valve 40 is interposed, simply opens, at the opposite ends thereof, onto the opposite sides of the butterfly valve 34.

While I have described my invention in connection with specific embodiments thereof, and a particular method of its practice, it is to be clearly understood that this is done only by way of example and not as a limitation to the scope of my invention as set forth in the objects thereof and in the appended claims.

I claim:

1. In combination with a gas compressor, a lubrication system therefor, comprising:
    first means for conducting gas to said compressor; and
    second means for conducting gas and lubricant from said compressor; wherein
    said second means includes reservoir means for storing lubricant; further including
    third means communicating with said reservoir means and said compressor for passing lubricant therethrough from said reservoir means to said compressor;
    means, coupled to said second means, operative for controllingly modulating the fluid conduct of said second means;
    means, coupled to said third means, for directly communicating with lubricant therewithin, and for sensing a given condition of lubricant therein; and
    means, coupled to said sensing means and said modulating means, responsive to a given setpoint of said given condition, as sensed by said sensing means, for operating said modulating means.

2. Lubrication controlling means, for use in combination with a gas compressor, such gas compressor having first means for conducting gas to said gas compressor, second means for conducting gas and lubricant from said gas compressor, said second means including a reservoir for storing lubricant, and means for supplying lubricant from said reservoir to said gas compressor, wherein said lubricant controlling means comprises:
    means, for coupling thereof to said second means, operative for modulating the fluid conduct of said second means;
    means for directly communicating with lubricant in said lubricant-supplying means, for sensing a given condition of lubricant in said supplying means; and
    means, for coupling thereof to said sensing means and said modulating means, responsive to a given setpoint of said given condition, as sensed by said sensing means, for operating said modulating means.

3. In combination with a gas compressor, a lubrication system therefor, comprising:
    first means for conducting gas to said gas compressor; and
    second means for conducting gas and lubricant from said gas compressor; wherein
    said second means includes reservoir means for storing lubricant; further including conduit means for supplying lubricant from said reservoir means to said gas compressor;

means, coupled to said second means, operative for controllingly modulating the fluid conduct of said second means;

means, coupled to said conduit means, for directly communicating with lubricant therewithin, and for sensing a given condition of lubricant therein; and means, coupled to said sensing means and said modulating means, responsive to a given setpoint of said given condition, as sensed by said sensing means, for operating said modulating means.

4. The combination, according to claim 3, wherein:

said second means comprises a fluid-conducting line communicating with said gas compressor, at one end thereof, and having a given fluid-venting valve at the other end thereof;

said modulating means comprises another fluid-venting valve communicating with said line and operative in parallel with said given valve.

5. The combination, according to claim 4, wherein:

said sensing means comprises a temperature sensor for sensing temperature levels of lubricant;

said operating means comprises means responsive to a given temperature of lubricant, as sensed by said sensor, for operating said another valve.

6. The combination, according to claim 5, wherein:

said another valve is switch-operative; and said operation means comprises a switch operatively coupled to said another valve.

* * * * *